ced Sept. 29, 1970

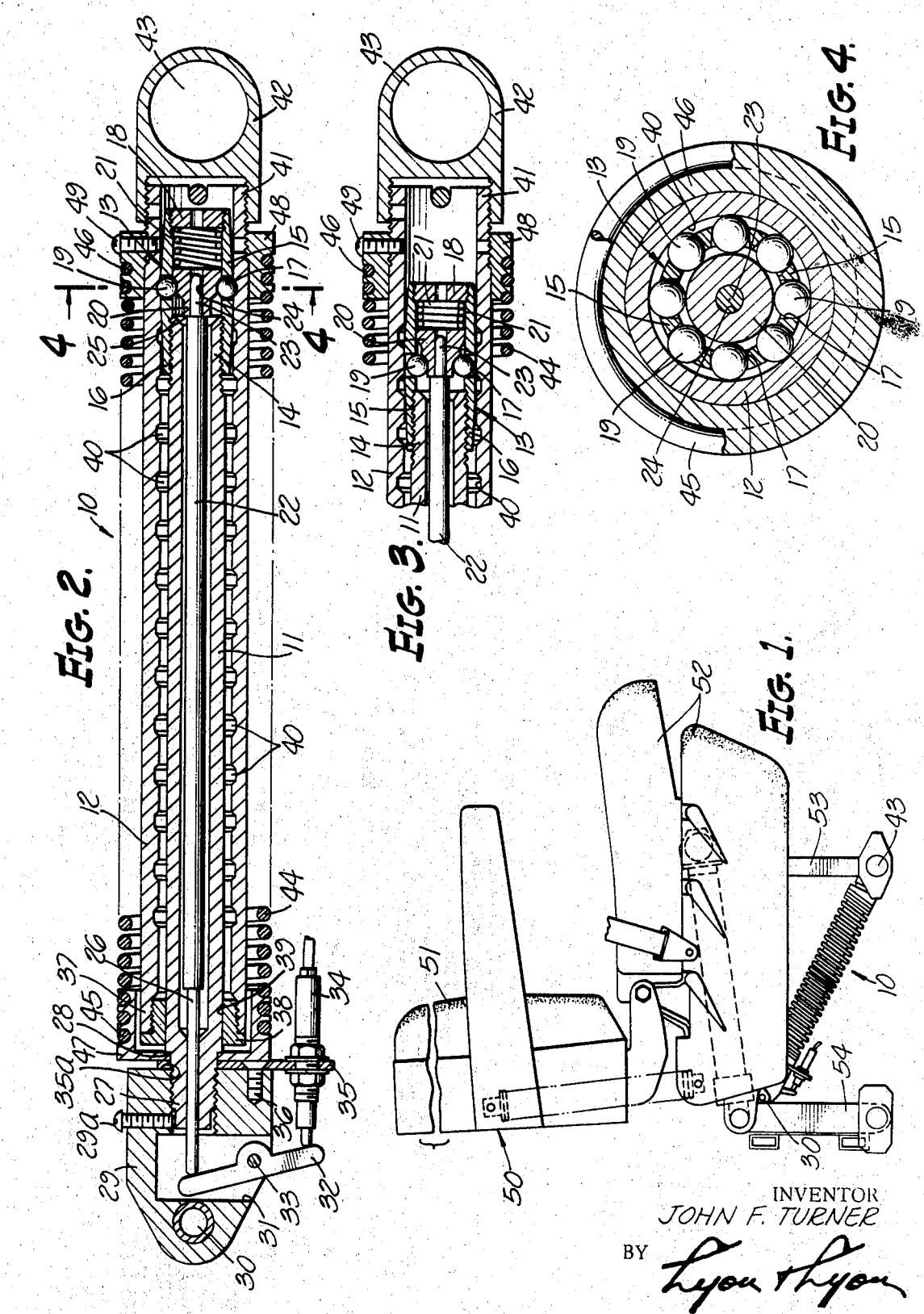

United States Patent Office 3,530,740
Patented Sept. 29, 1970

3,530,740
ADJUSTABLE LINK
John F. Turner, Granada Hills, Calif., assignor to Walter Kidde & Company, Inc., Belleville, N.J., a corporation of New York
Filed Nov. 26, 1968, Ser. No. 779,081
Int. Cl. G05g 5/06
U.S. Cl. 74—586  9 Claims

ABSTRACT OF THE DISCLOSURE

An axially adjustable link for support purposes includes a pair of concentric sleeves which move axially relative to each other and a mechanical lock which is adapted to prevent relative axial movement of the sleeves at a variety of adjusted positions. Release means operably connected to the lock releases the lock when adjustment of the link is required.

---

This invention relates to an adjustable link mechanism and is particularly directed to improvements in an elongated tubular link which can be extended axially.

The device is described in connection with an adjustable seat, however, the device is suitable for any situation where it is desirable to adjust the distance between two members and to hold and support the members apart at the adjusted distances.

Adjustable links of this nature are not entirely new. However, in the past it has been common to use a hydraulic system to lock the link in its adjusted axial position. Hydraulic systems are expensive, relatively complex and require a variety of parts which are susceptible to failure. In addition, hydraulic systems inherently have problem of slippage and fluid leakage.

When the adjustable link is used under conditions where the surroundings have a decorative appeal, for example when supporting a passenger seat in an airplane, fluid leakage must be avoided in order not to damage these surroundings. Slippage is undesirable under any conditions and should be completely eliminated whenever possible. However, the wide range of adjustability, ease of operation and compact design available in most hydraulic systems should not be impaired by the elimination of slippage and leakage.

With the above in mind, it is a primary object of this invention to provide a device for linkage and support purposes which can be adjusted axially and positively locked in a variety of adjusted positions. It is a further object of this invention to provide a device which operates smoothly and easily without fluid leakage. Also, the device provided must be able to withstand axial forces of sufficient magnitudes when it is in a locked position and yet require a minimum amount of space when used. A further object of this invention is that the device be economical to construct.

Additional objects and advantages will appear from the following description and the accompanying drawings.

FIG. 1 is a perspective view showing the device in connection with a seat.

FIG. 2 is a cross sectional view of the device in a closed and locked position.

FIG. 3 is a cross sectional view showing part of the device in a partially extended position after the lock mechanism has been released.

FIG. 4 is a sectional view taken along the lines 4—4 of FIG. 2.

Briefly, the device includes a pair of cylindrical sleeves or tubular members with one of the sleeves mounted concentrically within the other sleeve for axial movement therein. Attached to the inner sleeve is a mechanical lock mechanism which releasably engages the inner surface of the outer sleeve to prevent relative axial movement between the sleeves. A release device which includes a plunger positioned for axial movement within the inner sleeve and having one end in contact with the mechanical lock mechanism may be actuated to disengage the lock mechanism from the outer sleeve. To assist in the operation of the device a power spring is mounted concentrically on the outer sleeve with one end affixed to the inner sleeve and the other end affixed to the outer sleeve.

Referring to the drawings, the adjustable link device, generally designated 10, includes a pair of cylindrical sleeves or tubular members 11 and 12. Sleeve or tubular member 11 is positioned concentrically within sleeve 12 for axial movement therein. Sleeve 11 is externally threaded at each end. The outer surface of the sleeve 11 is smoothly finished to facilitate the axial movement within sleeve 12.

A lock mechanism, generally designated 13, is attached to the threaded end 14 of the sleeve 11 which is within the outer sleeve 12. The mechanical lock mechanism 13 includes a cylindrical housing 15 which is threaded internally at both ends with one end 16 threaded onto the end 14 of sleeve 11. Approximately mid-way between the ends of the cylindrical housing are a plurality of circumferentially spaced openings 17. The outer surface of the cylindrical housing 15 tapers inwardly from the openings 17 to each end whereby only a portion of the outer surface slidably contacts the inner surface of the outer sleeve 12. An externally threaded spring retainer 18 encloses the other end of the cylindrical housing 15. A plurality of steel balls 19 seat in the openings 17. A stepped wedge 20 is slidably mounted co-axially within the cylindrical housing 15 and contacts the underside of the balls 19. A plunger spring 21 also positioned axially within the cylinddrical housing 15 is between the wedge means 20 and the spring retainer 18. The wedge 20 and spring 21 act as the biasing means to force the balls 19 outwardly from the surface of the cylindrical housing 15 and against the inner surface of sleeve 12.

Acting on the tapered end of the wedge 20 is a plunger or shaft 22 which is mounted axially within the sleeve or tubular member 11 and has one end 23, which is reduced in diameter, positioned in an axial bore 24 in the wedge means 20. A shoulder 25, at the transition between the reduced diameter of end 23 and the normal diameter of the plunger 22, is in contact with the tapered end of the wedge means 20. The other end 26 of the plunger 22 is also reduced in diameter and extends axially out from the threaded end 27 of the sleeve 11. Between the threaded portion at the end 27 and the smoothly finished surface of sleeve 11 is lip 28. Threadably connected to the end 27 is a connector 29. A lock screw 29a extends through the connector 29 to engage the end 27 of the sleeve 11 to prevent loosening. The connector 29 has an opening 30 for purposes of pivotally mounting the link device 10 at one end. A center portion of the connector 29 is open at 31 to receive the end 27 of the plunger 22 and to house a lever 32 which is pivotally mounted at 33 in the open portion of the connector 29. One end of the lever 32 contacts the end 26 of the plunger 22. The other end of the lever 32 is in contact with an actuating mechanism 34 which is mounted on a flange member 35. The flange member 35 has an opening 35a to receive end 27 of the sleeve 11 and hold flange member 35 between the connector 29 and the lip 28. The flange member 35 is attached to the connector 29 by a screw 36.

The outer sleeve 12 is internally threaded at one end 37 to receive a cap 38. The cap 38 has a central opening 39. The inner sleeve 11 is in slidable contact with the inner surface of the central opening 38 and moves axially therein. The inner surface of the sleeve 12 is provided with a plurality of annular recesses or grooves 40 located axially at predetermined intervals to receive the balls 19 when the balls are pushed outwardly from the cylindrical housing 15. Sleeve 12 is externally threaded at the other end 41 to receive an internally threaded clevis or connector 42. The connector 42 is provided with a circular opening 43, which is perpendicular to the axis of the sleeve 12, for pivotally mounting the adjustable link device 10 at its other end.

A power spring or resilient member 44 is mounted concentrically about the outer sleeve 12. The ends 45 and 46 of the spring 44 are affixed to a pair of spring holders 47 and 48, respectfully. The spring holder 47 is mounted between the flange member 35 and the lip 28. Spring holder 48 located near the externally threaded end 41 of the outer sleeve 12 is attached to the outer sleeve 12 by a screw 49.

To operate the link, a switch located at some convenient position causes the actuator 34 to pivot the lever arm 32 which forces the plunger 22 to move axially against the wedge means 20 in opposition to the spring 21. This allows the balls 19 to move inwardly and out of engagement with a groove 40 on the inner surface of the outer sleeve 12. Once the balls become disengaged from the inner surface of the sleeve 12, the inner sleeve 11 can be moved axially within sleeve 12. After the inner sleeve 11 is moved to the desired position, the switch is moved to cause the actuator 34 to release the pressure acting on the lever 32 and allow the shaft 22 to move axially away from the wedge means 20. The spring 21 then pushes against the wedge means 20 to force the balls to an upwardly extended position until the balls come to rest in one of the annular grooves 40. The seating of the balls in an annular groove prevents any further axial movement between the inner sleeve 11 and the outer sleeve 12. The power spring 44 assists in the movement of the sleeve 11 when the link device is being extended and provides for smooth movement of the sleeve 11 when the link device is being collapsed. However, it should be recognized that the link device 10 will also function without the spring 44.

An example of how the device might be employed is best shown in FIG. 1. A seat of the type normally used by pilots in an airplane, generally designated 50, has a vertical back member 51 and a horizontal seat member 52. The seat member 52 is supported by a pair of vertical front legs 53 and a pair of vertical back legs 54. All the legs are pivotally secured to the floor of the airplane. The seat member 52 is slidably mounted on a pair of horizontal parallel rails, not shown, which extend between the upper ends of the back legs 54 and the upper ends of the front legs 53. The back member 51 is pivotally connected to the seat member 52. A link device 10, is pivotally connected at one end at 43 to a cylindrical bar between the lower secured ends of the front legs 53. The other end is pivotally connected at 30 to a horizontal member between the upper ends of the back legs 54.

In the closed or collapsed position as shown in FIG. 1 the adjustable link 10 holds the legs 53 and 54 in a vertical position. When the link is extended the legs 53 and 54 pivot about the lower secured end in a parallelogram the seat to support the seat member 52 in adjusted horibut the vertical distance between the seat member 52 and the airplane floor is reduced. When the desired distance is obtained the link device 10 is locked to hold the seat member 52 at that position. Phantom lines in FIG. 1 show how two other link devices may be connected to the seat to support the seat member 52 in adjusted horizontal positions and the back member 51 is various adjusted positions relative to the seat member 51.

The design of the device is such that the link is easily extended or collapsed to the axially adjusted positions and the lock mechanism is operated with a minimum amount of force. The concentric design of the device also allows the device to withstand a great amount of axial force after it has been locked in a fixed position and further provides a compact unit which has minimum space requirements. The large number of annular grooves provide a wide range of adjustability and insure positive locking. The mechanical lock eliminates slippage, does not require any fluid for operation, and has a minimum of parts.

Having fully described my invention, it is to be understood that I do not wish to be limited to details herein set forth, but our invention is of the full scope of the appended claims.

I claim:

1. An axially adjustable link device, comprising: a pair of sleeve means; one of said sleeve means mounted concentrically within said other sleeve means; a mechanical lock means connected to one of said sleeve means and releasably engaging the other sleeve means to prevent relative axial movement between said sleeve means said mechanical lock means including a cylindrical housing having a plurality of openings, a plurality of balls, each ball mounted within one of said openings, a wedge mounted axially within said housing and contacting said balls, a spring acting on said wedge to force said balls in the openings outwardly from said housing member to engage said outer sleeve means; the inner surface of said outer sleeve means being recessed at predetermined intervals to receive said balls when said balls are extended outwardly; and release means operably engaging said mechanical lock means to disengage said mechanical lock means from the other sleeve means.

2. An axially adjustable link device, comprising: a pair of sleeve means; one of said sleeve means mounted concentrically within said other sleeve means; a mechanical lock means connected to one of said sleeve means and releasably engaging the other sleeve means to prevent relative axial movement between said sleeve means; and release means operably engaging said mechanical lock means to disengage said mechanical lock means from the other sleeve means, said release means being hydraulically actuated.

3. An adjustable link device, comprising: a pair of sleeve means, said sleeve means each having connecting means at one end for pivotally securing the adjustable link between a pair of members, at least one of said members movable relative to said other member; one of said sleeve means mounted concentrically within said other sleeve means; a mechanical lock means connected to one of said sleeve means and releasably engaging the other sleeve means to prevent relative axial movement between said sleeve means; and release means operably engaging said mechanical lock means to disengage said mechanical lock means from the other sleeve means.

4. An axially adjustable link to hold a seat in a predetermined fixed position, comprising:
   an elongated tubular member having one end pivotally connected to the seat;
   a sleeve mounted concentrically about said tubular member and having one end pivotally anchored;
   mechanical lock means attached to the other end of said tubular member and releasably engaging the inner surface of said sleeve to prevent axial movement of said tubular member relative to said sleeve;
   release means to disengage said lock means thereby allowing said tubular member to move axially relative to said sleeve.

5. The device of claim 4, wherein said release means includes a plunger positioned for axial movement within said tubular member, having one end in contact with said lock means.

6. The device of claim 4, wherein said lock means includes a hollow cylindrical housing having a plurality of circumferentially spaced openings, a plurality of balls, each ball mounted within one said opening, a wedge mounted axially within said cylindrical housing and contacting said balls, a spring causing said wedge to force said balls outwardly from said housing against the inner surface of said sleeve.

7. The device of claim 4, wherein the inner surface of said sleeve is notched at predetermined intervals to receive said outwardly extending balls.

8. The device of claim 4, wherein resilient means is mounted concentrically on said sleeve and has one end operably connected to said sleeve and the other end operably connected to said tubular member.

9. The device of claim 4, wherein the outer surface of said tubular member is smoothly finished to facilitate axial movement of said tubular member within said sleeve.

References Cited

UNITED STATES PATENTS

| | | | |
|---|---|---|---|
| 2,481,190 | 9/1949 | Binns | 74—2 XR |
| 2,579,305 | 12/1951 | Cushman. | |
| 2,658,777 | 11/1953 | Rauglas. | |
| 2,748,229 | 5/1956 | Block | 74—2 XR |
| 3,127,788 | 4/1964 | Martens | 74—586 |
| 3,463,444 | 8/1969 | Churchill et al. | 251—70 |
| 3,463,445 | 8/1969 | Churchill et al. | 251—70 |

FRED C. MATTERN, Jr., Primary Examiner

F. D. SHOEMAKER, Assistant Examiner